United States Patent
Shimizu et al.

(10) Patent No.: US 6,819,764 B1
(45) Date of Patent: Nov. 16, 2004

(54) DATA PROCESSOR, COMMUNICATION SYSTEM AND RECORDING MEDIUM

(75) Inventors: Hideo Shimizu, Kawasaki (JP); Fumihiko Sano, Fuchu (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/379,791

(22) Filed: Aug. 24, 1999

(30) Foreign Application Priority Data

Aug. 24, 1998 (JP) .......................................... 10-237205

(51) Int. Cl.$^7$ ................................................ H04L 9/16
(52) U.S. Cl. ........................................ 380/37; 380/43
(58) Field of Search ............................ 380/37, 42, 43, 380/28, 243, 29, 264

(56) References Cited

U.S. PATENT DOCUMENTS

| | | | |
|---|---|---|---|
| 3,962,539 A | | 6/1976 | Ehrsam et al. |
| 5,261,003 A | * | 11/1993 | Matsui ........................ 380/264 |
| 5,488,661 A | * | 1/1996 | Matsui ......................... 380/29 |
| 5,594,797 A | * | 1/1997 | Alan ar a et al. ............. 380/28 |
| 6,038,321 A | * | 3/2000 | Torigai et al. ............... 380/268 |

OTHER PUBLICATIONS

Quisquater et al., "The Importance of 'Good' Key Scheduling Schemes (How to Make a Secure DES Scheme with $\leq 48$ Bit Keys?)," Advances in Cryptology—CRYPTO '85 Proceedings, pp. 537–542.

* cited by examiner

*Primary Examiner*—Matthew Smithers
(74) *Attorney, Agent, or Firm*—Finnegan, Henderson, Farabow, Garrett & Dunner, L.L.P.

(57) ABSTRACT

There is provided a data processor wherein a plain text is encrypted to a cipher text by using a encryption key and/or a cipher text is decrypted to a plain text by using a decryption key, which device is constructed of a plurality of key conversion functions fk sequentially connected, which each are an involution type, and which conduct key conversion processing and output extended keys based on the key for encryption or decryption, or key conversion results, a key conversion section in which the key conversion results are sequentially transferred between the key conversion functions in the order or the reverse order, a plurality of round functions fr sequentially connected, which are an involution type, and which conducts encryption and/or decryption by using extended keys, and a data randomize section in which processing results in the round functions fr are sequentially transferred between the round functions fr in the order or the reverse order. With the device, the scale of a secret key encryption device can be small, security can be increased and further, key management can be conducted with ease.

14 Claims, 7 Drawing Sheets

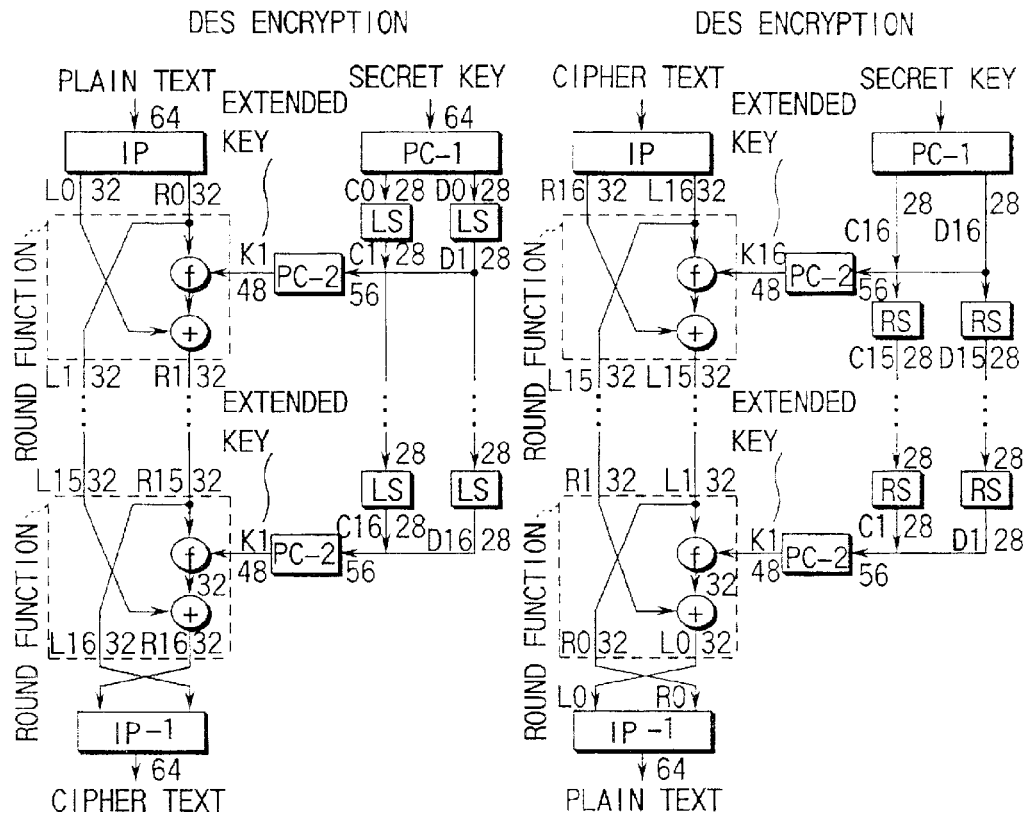
FIG. 1A PRIOR ART
FIG. 1B PRIOR ART
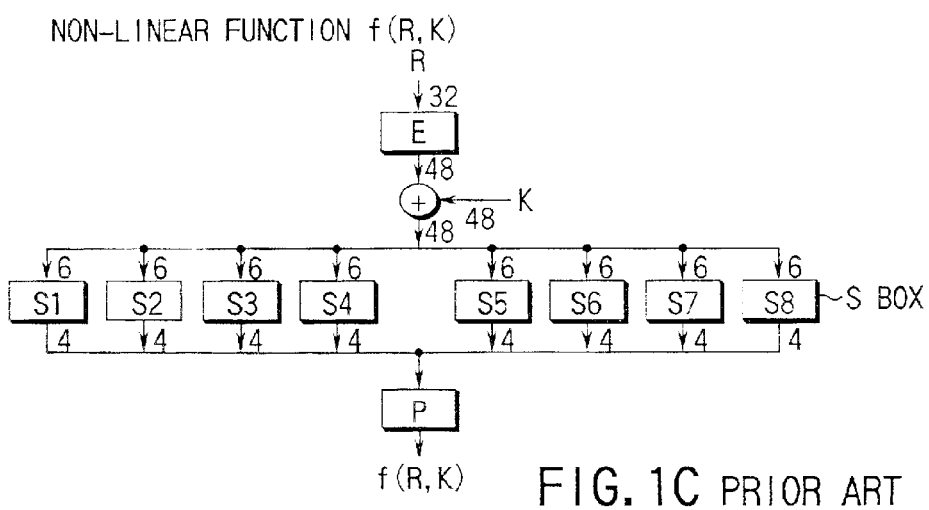
FIG. 1C PRIOR ART

DATA PROCESSOR, COMMUNICATION SYSTEM AND RECORDING MEDIUM

BACKGROUND OF THE INVENTION

This invention relates to a data processor, a communication system and a recording medium.

Encryption in data transmission is generally performed due to recent progresses in computers and a communication technology. There have been available a public key cryptosystem and a secret key cryptosystem and the DES encryption system is widely accepted as the secret key cryptosystem.

FIGS. 1A to 1C are block diagrams for illustrating the DES encryption system.

In encryption under the DES system, data which are created by applying initial transposition IP to a plain text is further subjected to processing through round functions 16 times. Subsequently, the data which have been subjected to the round function processing receives inverse transposition $Ip^{-1}$ which is inversion of the initial transposition, thereby producing a cipher text. Herein, the processing through round functions are executed by providing the round functions with extended keys generated from an original key.

That is, an encryption device adopted in the DES system is mainly constructed of a data randomize section in which data as an object to be encrypted through numerous round functions are randomized and a key conversion section which provides the round functions of the data randomize section with extended keys.

On the other hand, decryption in the DES system is achieved in such a manner that data as an object to be decrypted are subjected to processing through round functions in the order reverse in the encryption as shown in FIG. 1B. Therefore, extended keys supplied from the key conversion section are generated in the reverse order in which the keys are used in the encryption starting with a key used in the last round function in the encryption.

A first advantage of the DES system is that a considerable part of encryption circuitry is commonly adopted in decryption. That is, round functions for encryption and decryption used in the data randomize section are the same between both processing only with the exception that the order of use of the functions are reversed as shown in FIGS. 1A and 1B.

A second advantage of the DES system is that only one key is always an object of management since the same secret key is used in both ways of encryption and decryption. In the DES system, the following processing is performed in the key conversion section so that extended keys can be generated in the reverse order using the only one key.

That is, in a case of the encryption, the secret key receives a left rotate shift to generate extended keys. At this point, the extended keys can be generated in the reverse order by designating the sum of shifts to a given value. That is, in the decryption, the secret key is only required to be subjected to a right rotate shift to generate the extended keys. Thereby, the last extended key in the encryption and the first extended key in the decryption are the same.

However, in the DES system described above has a problem as follows:

Processing in the key conversion section, first, includes a left rotate shift in encryption and a right rotate shift in decryption, which are different in terms of processing, and therefore, the same circuitry cannot be shared in function between encryption and decryption devices in the key conversion section. That is, when an encryption/decryption device for encrypting and decrypting data is constructed as an actual device, part of the circuitry which is commonly used in both of encryption and decryption is not necessarily much enough. Hence, the overall scale of the encryption/decryption device cannot be constructed to be sufficiently small.

Then, since in the DES system, processing in the key conversion section is performed only through transposition, a security problem arises from the fact that there is an encryption key with a weak security, which is generally called a weak key. In addition, since the processing in the key conversion section is not non-linear, contribution of the processing to the cryptographic robustness of an extended key thus generated cannot be so large. Non-linear part of the DES system is limited to part called as an S-box in a function f in a round function shown in FIG. 1C.

Accordingly, there has been desired a cryptosystem in which extended keys generated from the key conversion section sufficiently contribute to cryptographic robustness.

On the other hand, in order to eliminate a weak point of the key conversion section such as a weak key associated with the DES system, oneway function such as a hash function has been employed in the key conversion section as trial. For example, FEAL calculates extended keys which the data randomize section requires in a case where oneway function is used for the conversion.

While the FEAL is more secure in that no weak keys are not present in the system, extended keys cannot be generated in the reverse order as in the DES system since oneway function is adopted in the key conversion section. Therefore, in order to enable decryption in the FEAL, all kinds of extended keys which can be achieved from a secret key are once generated in the key conversion section same as used for encryption to store them in a buffer. Then, the extended keys already stored in the buffer is retrieved in the order reverse to the order of generation and decryption is thus completed.

In such a way, however, another problem arises since storage of the extended keys requires an increase in the cost, that is, an increase in memory requirement. Besides, thus generated extended keys not only increases a memory requirement, but requires an additional management cost of numerous keys, though temporarily. Furthermore, due to a time period required for key extended conducted in advance in decryption, a time required for decryption is problematically long.

In conventional techniques, as described above, if extended keys are generated in the reverse order, the scale of a secret key encryption device cannot sufficiently be compact and in addition security is deteriorated. On the other hand, if security is desired to be increased, extended keys cannot be generated in the reversed order and thereby not only is a memory resource is largely required, but there arises a necessity for management of numerous keys and a processing time period is extended, which has led to a problem.

BRIEF SUMMARY OF THE INVENTION

The present invention has been made in light of such circumstances and accordingly it is an object of the present invention to provide a data processor, a communication system and a recording medium whereby the scale of a secrete key encryption device can be small, security of a key is increased and further, key management can be made easy.

The essence of the present invention is not only to employ an involution function in which conversion and inverse conversion are same for generation of an extended key, but also to enable generation of an extended key in a reverse order by using the involution function in a reverse order based on a decryption key in decryption which key is a result of processing a encryption key in a key conversion section.

According to the present invention, since there is no limitation on a function to be employed in the key conversion section with the exception that an original key is converted by using an involution function and further it is not necessary for an encryption key and a decryption key to be same, there is only very little limitation imposed on functions which can be employed in the key conversion section. Hence, it is possible that functions by which extended keys with high security are generated are selected and the key conversion section can be constructed of such functions. Besides, since an extended key can be generated from a decryption key in a reverse order, the same key conversion section can be employed in encryption and decryption, which entails a smaller scale of a device circuit.

Further, by employing an asymmetric key in a secrete key cryptosystem through a crucial change, the present inventors have reached the present invention.

Encryption algorithms can classify encryption into two kinds: symmetric key encryption and asymmetric key encryption according to whether or not the same key is employed for encryption and decryption. Further, the algorithms can classify encryption into two kinds: secret key encryption and public key encryption according to whether or not an encryption key is made public and a sender can prepare a cipher text using a public key.

Of combinations of such classifications, only two combinations, that is, of a symmetric, secret key cryptosystem and an asymmetric, public key cryptosystem, have conventionally been known. A symmetric, public key cryptosystem is impractical in terms of principle but an asymmetric, secret key cryptosystem is possible in thought. However, in the case of an asymmetric, secret key cryptosystem, since there arises a necessity to manage a plurality of secret keys for one processing of encryption/decryption, a disadvantage from a management cost and the like cannot be avoidable. Further, in the case, another problem occurs about how to realize asymmetric secret keys. Accordingly, such a cryptosystem has had no chance to be employed in a conventional technology.

On the other hand, in the present invention, there is provided a cryptosystem in which only if one secret key (an encryption key or a decryption key), though asymmetric, is on hand, encryption and decryption are enabled in both ways, and thereby, a problematic management of a plurality of secret keys is avoided and a practically useful asymmetric, secret key cryptosystem is realized. This is because, in the cryptosystem, a cipher text encrypted by an encryption key can be decrypted by a decryption key, while a cipher text encrypted by a decryption key can be decrypted by an encryption key.

That is, in a case where one party has only an encryption key, while the other party has only a decryption key output by converting the encryption key in a key conversion section, encryption and decryption go this way: first, a cipher text prepared from a plain text by one party with an encryption key can be restored to the plain text by processing in a reverse order with a decryption key on the other party side. Then while a cipher text prepared from a plain text by the other party with the decryption key can be restored to the plain text by processing in a reverse order with the encryption key on the one party side.

Then, means of the present invention for realizing the object will be described in detail.

According to a first aspect of the present invention, there is provided a data processor in which at least one of encryption of a plain text to a cipher text by using an encryption key and decryption of a cipher text to a plain text by using a decryption key is performed, comprising:

a key converting section in which a plurality of key conversion functions, which are an involution function, and which conduct key conversions to output extended keys based on one of the encryption key and the decryption key and results of key conversion of one of the encryption key the decryption key are sequentially connected and results of the key conversion are in an order or in another order reverse to the order transferred between the key conversion functions; and a data randomize section in which at least one processing of encryption of the plain text to the cipher text and decryption of the cipher text to the plain text is performed by using the extended keys output from the key conversion section.

Further according to a second aspect of the present invention, there is provided a data processor of the first aspect, wherein the data randomize section includes a plurality of round functions which are involution functions and which perform at least one of encryption and decryption by using the extended keys, the plurality of round functions are sequentially connected, and results of the processing by the round functions are transferred in an order or in another order reverse to the order transferred between the plurality of round functions.

The data processor serves as main circuitry which can be used not only in an encryption device but in a decryption device. That is, when a key and data are sequentially processed, data encryption can be realized, while when a key and data are subjected to processing in the reversed order, data decryption can be achieved. The reason why such processing are possible is that the key conversion function and the round function are both of an involution type.

Therefore, when the present invention is utilized in an encryption/decryption device, the device scale of the kind can be small and compact.

Further, according to a third aspect of the present invention, there is provided a data processor of the first aspect, wherein the key conversion functions not only take first keys and results of conversion of the first keys as objects to be processed in the key conversion, but also perform the key conversion by using a second key.

According to the present invention, processing in the key conversion section is similar to that of the data randomize section and extended keys which have a very low probability to be a weak key or the like can be output. Therefore, robustness of a cryptosystem can be increased.

Further, according to a fourth aspect of the present invention, there is provided a data processor of the third aspect, wherein the second key is included in at least one of the encryption key and the decryption key.

Further, according to a fifth aspect of the present invention, there is provided a data processor of the fourth aspect, wherein the second key has different types of keys, at least one of the encryption key and the decryption key includes the different types of keys and at least one of the encryption key and the decryption key is variable in length.

Further, according to a sixth aspect of the present invention, there is provided a data processor of the second aspect, wherein the key conversion functions include round functions same as that of the data randomize section.

Further, according to the a seventh aspect of the present invention, there is provided a communication system comprising:

one communication device which includes a data processor according to claim 1 and holds one key which serves as the encryption key and the decryption key; and another device which includes a data processor according to claim 1 and holds other key which serves as the encryption key and the decryption key, and which is a result of key conversion of the one key in the key conversion section of the another device.

According to the present invention, the communication systems can perform any of an encryption and decryption with one key held by each. Incidentally, herein, secret keys of the respective communication systems are not necessarily same as one another. That is, the communication is of an asymmetric, secret key cryptosystem.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A, 1B and 1C are block diagrams for illustrating the DES system;

DETAILED DESCRIPTION OF THE INVENTION

Below, embodiments of the present invention will be described.

(First Embodiment of the Present Invention)

Figure 2:
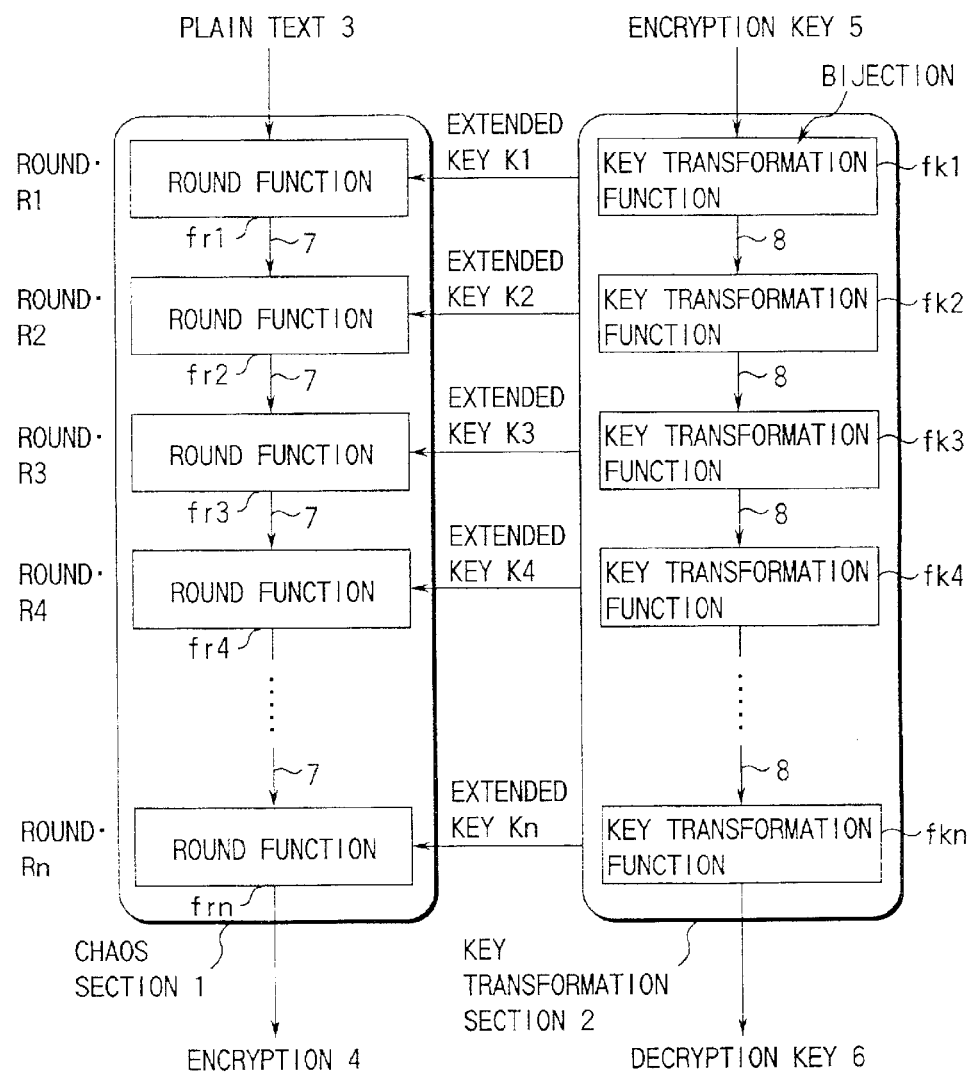
FIG. 2 is a block diagram showing an example of a main part of a configuration of a data processor and an encryption algorithm according to a first embodiment of the present invention.

FIG. 2 is a block diagram showing an example of a main part of a configuration of a data processor and an encryption algorithm according to a first embodiment of the present invention.

The data processor is constructed as an encryption/decryption section of a computer such as a personal computer and a work station and hereinafter, when the term "data processor" is used, the term means an encryption/decryption device in which encryption and decryption are conducted.

The encryption/decryption device is mainly constructed of a data randomize section 1 and a key conversion section 2. These sections 1 and 2 are commonly used for both of encryption and decryption. Further, functions such as transposition, though not shown, may be provided before and after the data randomize sections 1 and key conversion section 2.

The data randomize section 1 outputs a cipher text 4 by encrypting a plain text through n rounds of processing from round R1 to round Rn and a plain text 3 by decrypting a cipher text 4 through rounds Rn to R1. In the data randomize section 1, round functions fr1 to frn (hereinafter also simply referred to as a round function fr) are provided corresponding to the rounds R1 to Rn.

A round function fr outputs an intermediary encryption result 7 or an cipher text 4 by inputting a plain test 3 or an intermediary encryption result 7 and an extended key K from the key conversion section 2. The round functions fr1 to frn are similar to the round functions, for example, in the DES system and cascaded in the order.

On the other hand, in the key conversion section 2, key conversion functions fk1 to fkn (hereinafter also simply referred to as a key conversion function fk) are provided corresponding to rounds R1 to Rn. A key conversion function fk outputs an intermediary key conversion result 8 or a decryption key 6 and an extended key K by inputting an encryption key 5 or an intermediary key conversion result 8. That is, the key conversion functions fk1 to fkn gives the extended keys K1 to Kn to the round functions fr1 to frn.

The key conversion functions fk1 to fkn are cascaded in the order. Therefore, the encryption key 5 input from the first round R1 side of the key conversion section 2 is output as the decryption key 6 from the last round Rn side. If the decryption key 6 and the cipher text 4 are input from the last round Rn side, the encryption key 5 and the plain text 3 are output from the first round 1 side, which is shown in FIG. 3.

Figure 3:
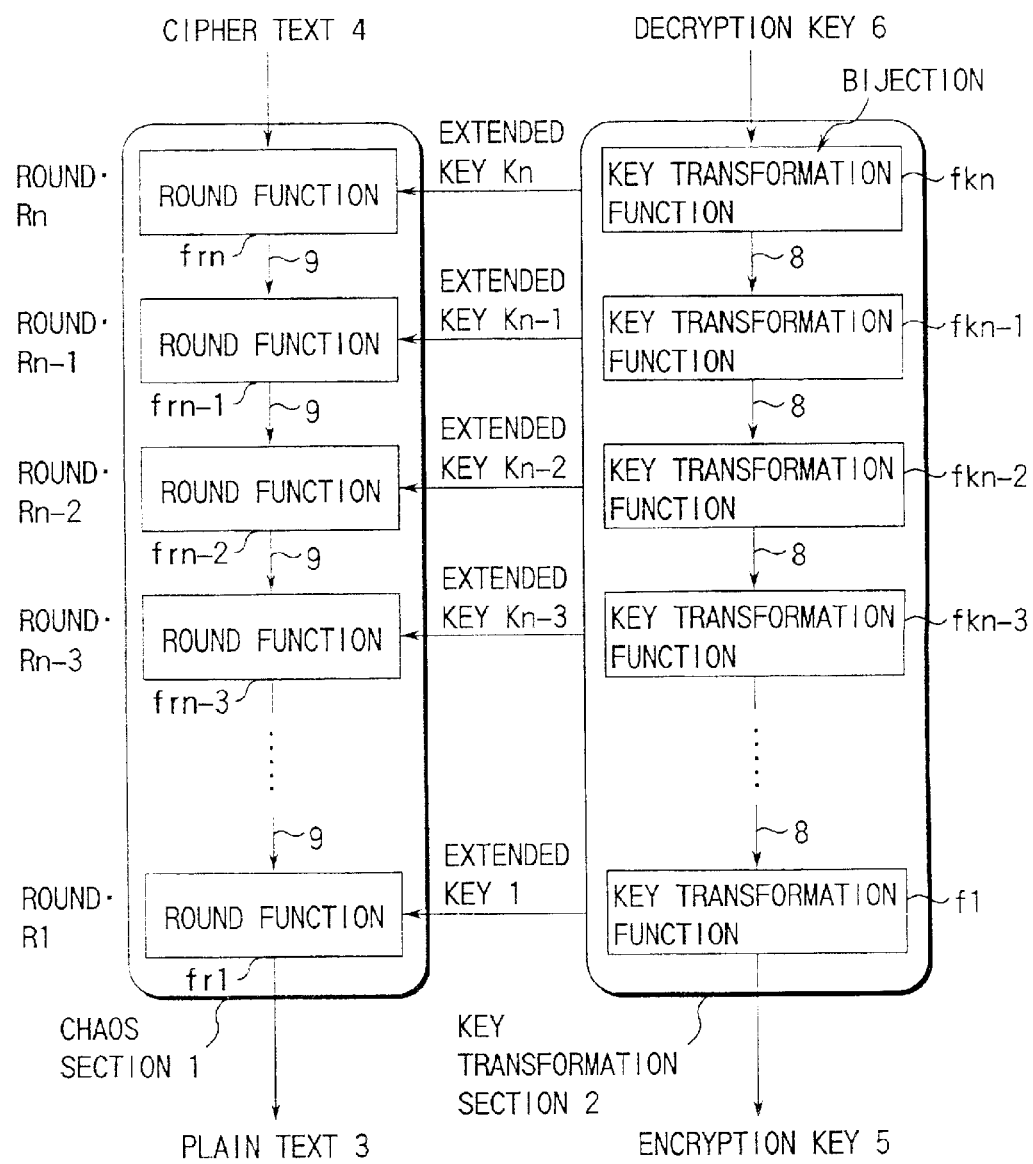
FIG. 3 is a block diagram showing an example of a main part of a configuration of a data processor and a decryption algorithm according to the first embodiment.

FIG. 3 is a block diagram showing an example of a main part of a configuration of the data processor and a decryption algorithm according to the embodiment.

In the means time, in the present specification, a key used for encryption of the first plain text 3 is called as an encryption key 5 and a key output as a result of the first encryption is called as a decryption key 6. In the present invention, a key input from the fist round R1 side functions as a key for encrypting a plain text while a key input from the last round Rn side functions as a key for decrypting a cipher text, regardless of the terms encryption key 5 or decryption key 6.

Accordingly, for example, if the decryption key 6 is input from the first round R1 side, the decryption key 6 functions as a key for encrypting a plain text, while if the encryption key 5 is input from the last round Rn side, the encryption key 5 functions as a key for decrypting a cipher text. In the mean time, the encryption key 5 and the decryption key 6 are present as a pair and in the above described case, the encryption key 5 and decryption key 6 are respectively output from the last round Rn side and first round R1 side. Therefore, the decryption can be conducted only by encryption key and decryption key which constitute a pair. In the following description, for convenience, keys are also referred simply to as follows: a key input from the first round R1 side is referred to as encryption key 5, while a key input from the last round Rn side is referred to as a decryption key.

The reason why the encryption key 5 and decryption key 6 are associated with each other in such a manner is a nature of a key conversion function fk provided in the key conversion section 2, which contents will be disclosed below:

That is, a key conversion function fk is constructed of involution functions. An involution function is a kind of bi-directional function and the conversion and the reverse conversion of the function are the same. Since the conversion and the reverse conversion are the same in each key conversion function fk, a relationship of the encryption key 5 and decryption key 6, which is described above, is realized. In the mean time, the bi-directional function is a function used for conversion between mappings each of which is surjective and infective.

Since an involution function allows common use of circuitry between an encryption conversion and a decryption conversion, the function is often used in an encryption algorithm. The present invention is characterized by that not only a round function fr, but a key conversion function fk are of an involution type.

Further, while there are available various kinds of involution functions, a function used as a key conversion function fk is desired to be high in randomize like no-linear functions f (R, K) within a round function of the DES system.

Operations of the data processor in the embodiment which is configured as described above will be described.

In encryption, the input encryption key 5 is converted, by key conversion functions fk to extended keys K and intermediary key conversion results 9 and finally to the decryption key 6.

In this situation, the plain text 3 is converted one by one in the round functions, by a round functions using extended keys K outputs of the key conversion sections 2, to generate intermediary encryption results 7 and the cipher text 4.

On the other hand, in decryption, decryption is successively performed in the data randomize section 1 into which the cipher text 4 is input, in the order reverse to in the encryption, and the intermediary decryption results 9 are sequentially output to finally output the plain text 3 as shown FIG. 3. Further, in the key conversion section 2 as well, the decryption key 6 is also input, key conversion is successively performed in the order reverse to in the encryption to output the encryption key 5. That is, referring to FIG. 2, the input/output in the flow of the encryption is reversed. FIG. 3 shows the flow whose directions is reverse to those of FIG. 2 and the data randomize section 1 and key conversion section 2 respectively employ the same circuitries as those of FIG. 2.

As described above, the data processor according to the embodiment of the present invention is provided with the key conversion section 2 in which key conversion functions fk which are a bijective mapping are cascaded, the extended keys K are output based on the input keys and further, is provided with the data randomize section 1 in which the round functions fr are cascaded, so that a plain text or a cipher text and the extended keys K are input and thereby a cipher text or a plain text is output. Hence, encryption and decryption are realized in which an encryption key and a decryption key which are not necessarily the same as each other are employed and thereby, the data randomize section 1 and key conversion section 2, whose circuitry is the same as each other, can be used as circuitry for encryption and decryption.

Accordingly, since main parts of the encryption device and the decryption device can perfectly be the same, the scale of a composite device can be compact.

In the mean time, although in a conventional secret key encryption algorithm, an encryption key and a decryption key are same as each other and an output result of a key conversion section is not a decryption key which is different from an encryption key, the encryption key and the decryption key are probably the same as each other.

Further, for example, if a non-linear function which has a high ability to randomize non-linear data bits is employed, robustness of the cryptosystem can be increased and thereby a cryptosystem with a higher security can be achieved since various kinds of functions can be selected, as far as a key conversion function fk is of an involution type.

(Second Embodiment of the Present Invention)

The present embodiment shows a concrete configuration example of a key conversion section and a key used therein in the first embodiment.

Figure 4:
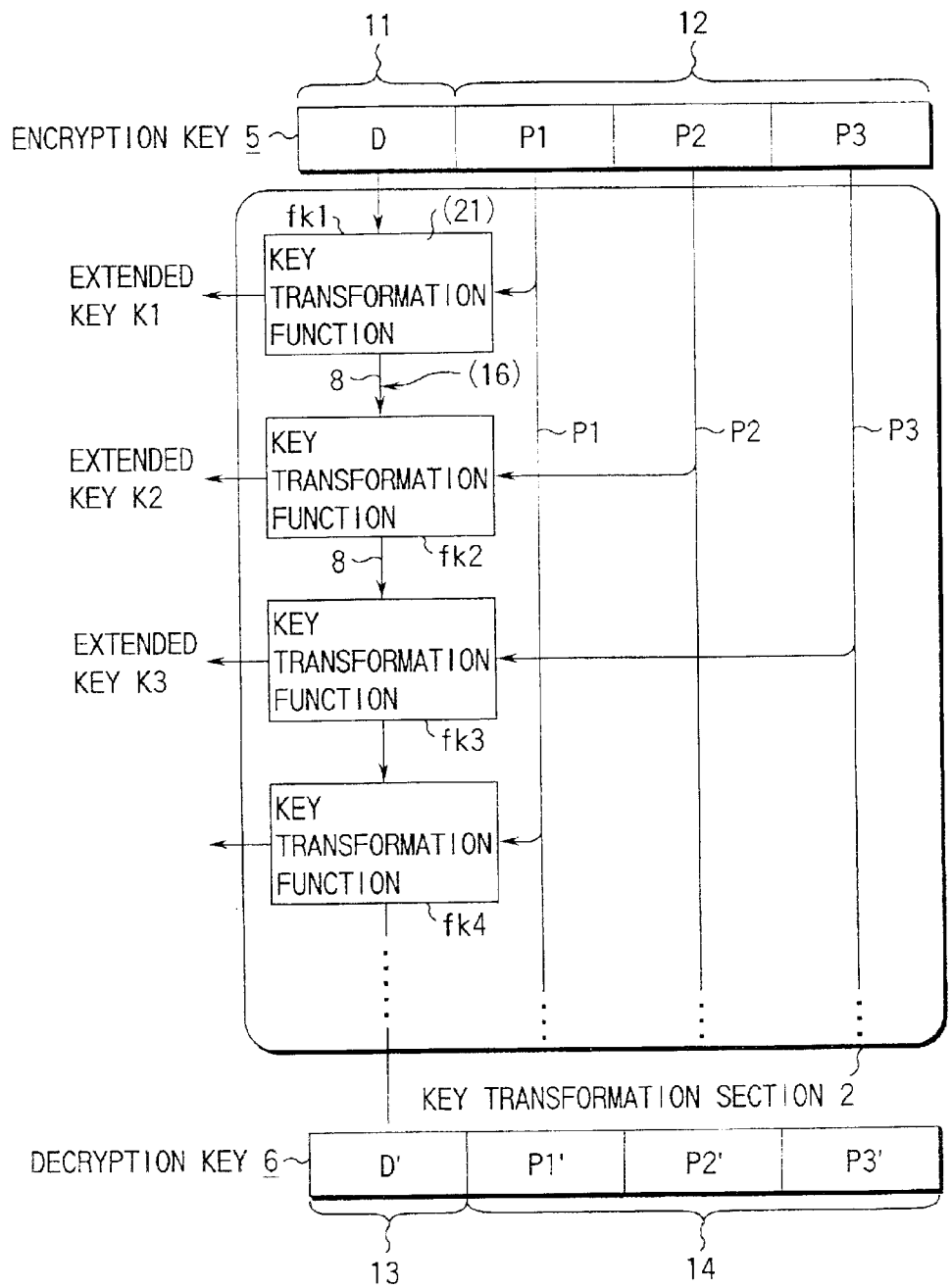
FIG. 4 is a block diagram showing an example of a configuration of a key conversion section in a data processor according to a second embodiment of the present invention.

FIG. 4 is a block diagram showing an example of a configuration of the key conversion section in the data processor according to a second embodiment of the present invention. The same constituents as those of FIG. 2 or 3 are indicated by the same reference marks and descriptions thereof are not given, while only constituents which are different from those are described.

In the data processor, any one of parameters P1, P2 and P3 are input to key conversion function fk in a key conversion section 2 and thereby, extended keys K are generated by using the one of the parameters. The other part of the configuration is constructed similar to that of the first embodiment.

In the embodiment, keys 5 and 6 have a variable length and constructed of data portions 11 and 13, and parameter portions 13 and 14.

The data portion 11 of the encryption key 5 is composed of an object data D to be converted and the parameter portion 12 is composed of conversion parameters P1, P2 and P3. That is, if a data portion and a parameter portion are respectively considered as keys, the keys 5 and 6 may be constructed of two keys. Further since a plurality of parameters can be stored in a parameter portion, the keys 5 and 6 may be constructed of more than two keys.

On the other hand, a data portion 13 of the decryption key 6 comprises data D' which have been converted and a parameter portion 12 is composed of conversion parameter P1', P2' and P3'.

In the mean time, in FIG. 4, while the data D and the parameters P1, p2 and P3 are drawn separately and sequentially for better understanding, the bit order may be interchanged therebetween. This key realizes a key with variable length by having a plurality of conversion parameters in the parameter portion 11. The number of parameters is not limited to 3 shown in the figure, but may be a number more than 3.

The data D of the encryption key 5 or an intermediary key conversion result 8 and any one of the parameters P1, P2 or P3 are input to a key conversion function fk and an intermediary key conversion result 8 or the data D' of the decryption key 6 and a extended key K are output. That is, the key conversion section 2 and the key conversion functions fk can be input with two keys including the data D (or an intermediary key conversion result 8) and the parameter P.

Then, description will be given to operations of the data processor in the embodiment which is configured as described above.

Overall procedures of encryption and decryption by extended keys are similar to those of the first embodiment.

Processing in the key conversion section 2 will be as follows:

The input data D of the encryption key 5 is converted one by one while outputting extended keys K for the rounds R by processing in the key conversion functions fk to which one of the conversion parameters. P1, P2 and P3 is input. The data D is finally output as the data D of the decryption key 6 after being converted to through round conversion.

The plurality of conversion parameters are sequentially applied for each round. When the number of the rounds is larger than the number of the conversion parameters, the conversion parameters are repeatedly applied. While the repeated application is cyclically effected in the embodiment, another rule for the application may be enforced.

In a parameter portion 14 of the decryption key 6, the parameters of the encryption key 5 are placed as they are or they are placed after being subjected to a prescribed processing.

Since, as described above, in the data processor according to the second embodiment of the present invention, the data D and D' which is key bodies and the parameters P and P' as so-called second keys, so to speak, are included in the encryption key 5 and the decryption key 6, in addition to that data processor has the same configuration as that of the first embodiment and the data D (or an intermediary key conversion result 8) and two kinds of keys of parameters P are input to the key conversion functions, effects similar to those of the first embodiment can be achieved, in addition, extended keys which cannot be deciphered can be generated and thereby security of a crypstosystm can be increased.

In the data processor of the embodiment, since a length of a key is variable, for example, by changing the number of parameters, security of the cryptosystem can further be improved.

(Third Embodiment of the Present Invention)

The embodiment shows a concrete configuration example of the key conversion section in the second embodiment.

Figure 5:
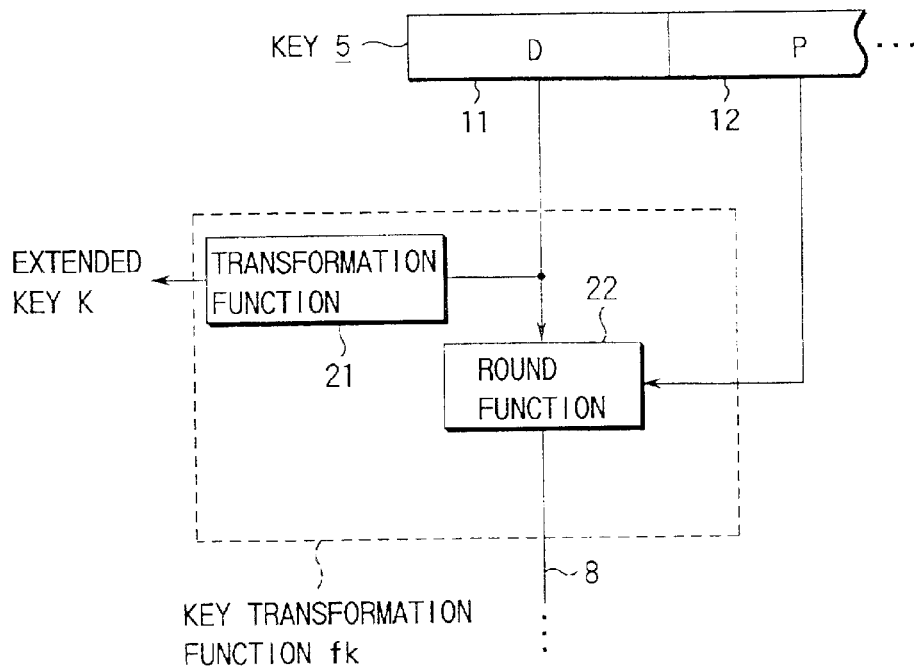
FIG. 5 is a block diagram showing an example of a configuration of a key conversion section in a data processor according to a third embodiment of the present invention.

FIG. 5 is a block diagram showing an example of a configuration of the key conversion section in the data processor according to a third embodiment of the present invention. The same constituents as those of FIGS. 2 to 4 are indicated by the same references and descriptions thereof will not be given while those of different constituents will only be made herein.

The data processor is constructed similar to the second embodiment with the exception that key conversion functions fk are provided with a configuration described below:

The encryption key 5 includes an object data D to be converted and a conversion parameter P similar to the second embodiment.

A key conversion function fk comprises a conversion function 21 which outputs an extended key K by converting the input data D or an intermediary key conversion result 8, and a round function 22 which is an involution function, and which has a high randndomize ability to data bits.

The round function 22 is the same round function as that of the data randomize section 1. The data D or an intermediary key conversion result 8 and a conversion parameter P are input to the round function 22, the data and the like receive data conversion and an intermediary key conversion result 8 or the final converted data D' is outputted. Herein, an input of an extended key K to a round function fk of the data randomize section 1 corresponds to an input of the parameter P.

An output result 8 of the round function 22 is an input of a key conversion function fk of the next round and the extended key K is obtained by processing data input to the round function 22 in the preceding round in the conversion function 21.

In the conversion function 21, processing such as rearrangement of bits are performed. Incidentally, the conversion function 21 can be omitted.

At this point, it should advantageously be noted that an extended key K is not prepared based on a signal on the output side of a round function 22. At least, in the embodiment, an extended key K is necessarily prepared based on a signal on the input side of a round function 22.

The reason why is that while an output of the first stage of the key conversion function 21 depends on the data D and the parameter P, it is mathematically proved that there are existent the other set of data other than the set of the data D and the parameter P when output of the round function 22 is used. The fact gives a wrong influence on the security of an encryption algorithm. That is, when a signal on the input side is used, the security of a cryptosystem is reduced due to ease in search for a key since a first set of the data D and parameter P of a key can be selected from the other values than one correct set of the data and parameter.

Then, descriptions will be given of operations of the data processor of the embodiment constructed as described above.

First, an input data to the key conversion function fk is processed in the conversion function 21 to output an extended key. On the other hand, the input data is randomized by the round function 22 and the resulted data is output to the next key conversion function fk.

The data processor of the embodiment operates similar to the second embodiment with the exception of the above described processing in a key conversion function.

As described above, since in the data processor of the embodiment of the present invention, the same round function 22 as that of the data randomize section 1 is used as the key conversion fk, in addition to a configuration similar to that of the second embodiment, not only can effects similar to the above described embodiment be obtained, but also the security can be increased enhancing the data randomize.

Since in the key conversion function fk, the extended key K is generated based on the data on the input side of the round function 22, there arises no chance to generate another key same as the extended key K and thereby, a cryptosystem with a high degree of the robustness can be realized.

In the mean time, the round function 22 can be omitted in the key conversion function fk in the last round. This is because in the embodiment, the extended key K is generated based on data before inputting to the round function 22. In this case, since the decryption key which is an output of the last stage is output without application of the round function, there arises an advantage to save a computation time period.

(Fourth Embodiment of the Present Invention)

The embodiment shows another configuration of the key conversion section of the first embodiment.

Figure 6:
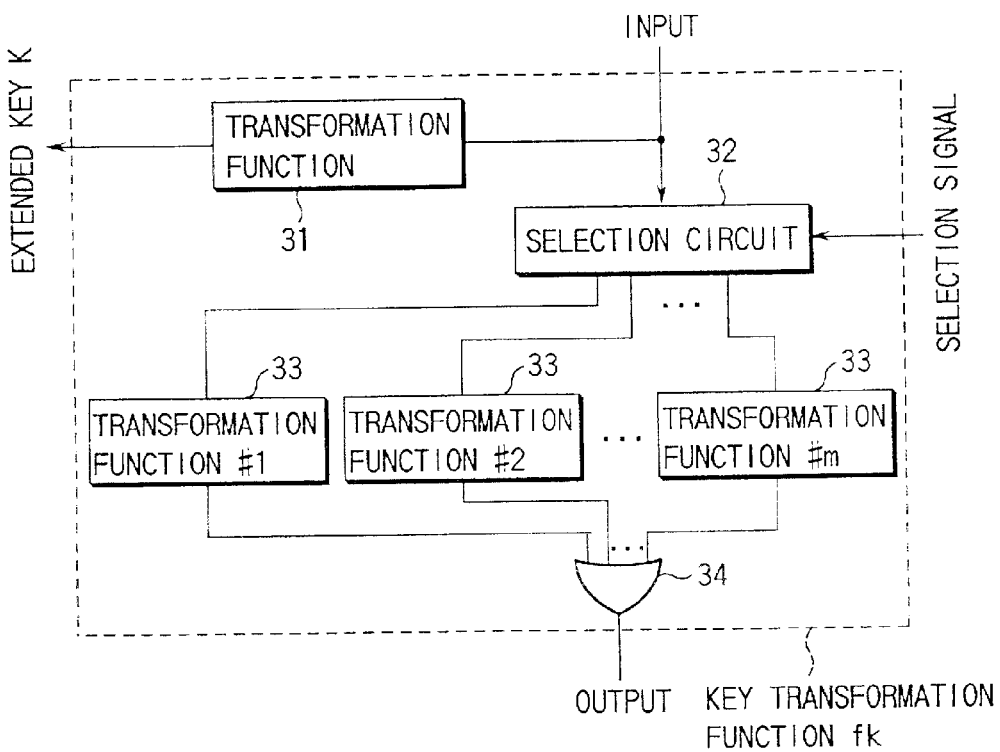
FIG. 6 is a block diagram showing an example of a configuration of a key conversion section in a data processor according to a fourth embodiment of the present invention.

FIG. 6 is a block diagram showing an example of a configuration of the key conversion function in the data processor according to the fourth embodiment of the present invention. The same constituents as those of FIGS. 2 to 4 are indicated by the same reference marks. Descriptions thereof are not given, but only the other constituents will be described.

The data processor is constructed similar to the first embodiment with the exception that that key conversion functions fk are provided with a configuration described below:

The key conversion function fk is constructed of a conversion function 31 which outputs an extended key K by converting the encryption key 5 or an input data which is an intermediary key conversion result 8, and a key conversion part which outputs an intermediary key conversion result 8 or the decryption key 6 by converting the input data. The key conversion part is in turn constructed of a selection circuit 6, a plurality of conversion functions 33 (#1, #2 ..., #n); and an OR gate 34.

The selection circuit 32 selects the conversion function 33 which converts input data based on a selection signal and transfers the input data to the selected conversion function.

The conversion function 33 is an involution function and randomizes the input data. The conversion function 33 with a high ability to randomize data bits as used in a round function of the data randomize section 1 is adopted.

The OR gate 34 outputs data after the conversion, which has been output from the conversion function 33 to the outside.

Then, description will be given of operations of the data processor in the embodiment which is constructed as described above.

Data input to the key conversion function fk is converted by the conversion function 31 and output as the extended key K. On the other hand, the input data is input to any one of the plurality of conversion functions 33 based on a selection signal given to the selection circuit 32.

Then, the input data is converted by the selected conversion function 33. The data which has been converted by the conversion function 33 is output after the converted data is compiled as one signal by the OR gate 34. The output data is input to the key conversion function fk at the next round or output as the decryption key.

The data processor of the embodiment operates in a similar manner to of the first embodiment with the exception of the above described processing within the key conversion functions.

As described above, since in the data processor according to the embodiment of the present invention, a plurality of conversion functions 33 are respectively equipped to the key conversion functions fk and an encryption key is converted by selecting any one of the plurality of conversion functions, in addition to a configuration similar to the first embodiment, not only is effects similar to the first embodiment obtainable, but a result of a key conversion is hard to be predicted, which entails a high degree of security of a cryptosystem.
(Fifth Embodiment of the Present Invention)

In the embodiment, description will be given of a communication system which uses the data processor of any one of the first to fourth embodiments.

Figure 7:
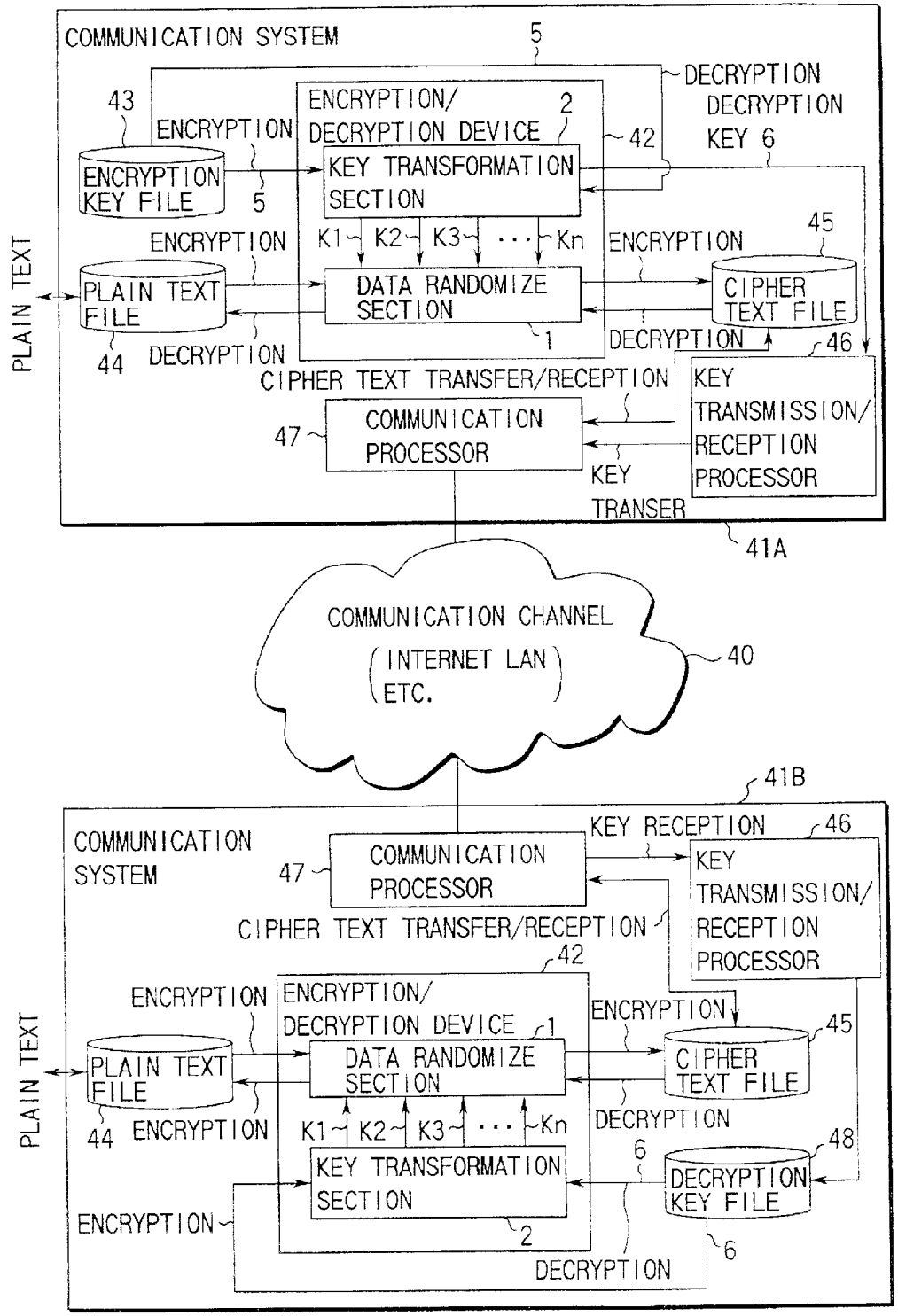
FIG. 7 is a block diagram showing an example of a main part of a communication system according to a fifth embodiment of the present invention.

FIG. 7 is a block diagram showing an example of a main part of a configuration of the communication system according to a fifth embodiment of the present invention. The same constituents as those of the second to sixth embodiments are indicated by the same reference marks.

The communication system comprises a communication system 41A which a communication party A uses, a communication system 41B which a communication party B uses, and a communication channel 40 such as internet and a LAN, wherein the communication systems A and B are connected.

The communication system 41A is a computer system equipped with data communication mean and comprises an encryption/decryption device 42, an encryption key file 43, and storage means (not shown) for storing a plain text file 44 and a cipher text file 45, a key transmission/reception processor 46 and a communication processor 47.

On the other hand, the communication apparatus 41B comprises a decryption key file 48 instead of the encryption key file 43 of the communication system 41A and the other constituents same as those of the communication system 41A.

That is, in the communication system 41A, only the encryption keys 5 are stored in the encryption key file 43 as a key for encrypting a plain text and a key for decrypting a cipher text, and in the communication system 41B, only the decryption key 6 is stored in the decryption key file 48 as a key for encrypting a plain text and a key for decrypting a cipher text.

The encryption/decryption device 42 is provided with the data randomize section 1 and the key conversion section 2 as a common part for encryption and decryption in any one of the first to fourth embodiments, and in addition, with various circuits for processing before and after encryption and decryption, selection of encryption or decryption, processing control and the like. In FIG. 7, in the encryption processing, a key and a plain text are input to the encryption/decryption device 42 from the let side and in the decryption processing, a key and a cipher text are input from the right side.

In the mean time, the encryption and decryption keys 5 and 6 which the communication systems 41A and 41B hold respectively constitute a pair and a decryption key 6 is obtained by converting an encryption key 5 in the key conversion section 2, while the encryption key 5 is obtained by converting the decryption key 6 in the key conversion section 2 in the reverse order of a conversion procedure of the former case.

The key transmission/reception processor 46 is means for transferring a key in a secured manner when the key is transferred or received between the communication systems 41A and 41B.

Then, description will be made of operations of the communication system in the embodiment configured as described above.

It is necessary for the communication parties A and B to share a key for mutual encryption communication as a precondition. For this reason, for example, one of decryption keys 6 generated when a cipher text is prepared by the communication system 41A is transferred to the communication system 41B side through the key transmission/reception processor 46. The transferred decryption key 6 is stored in the decryption key file 48.

Figure 8:
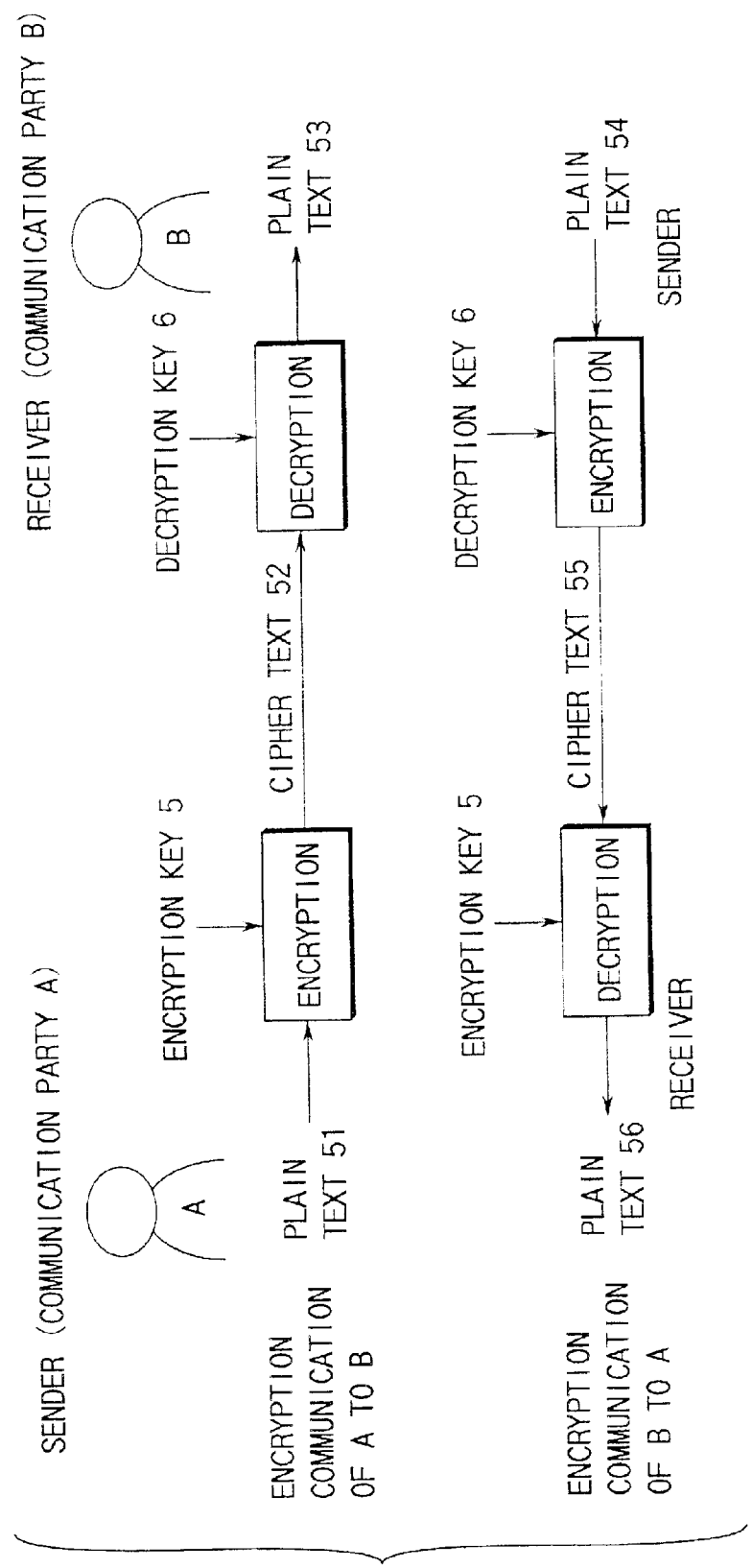
FIG. 8 is a representation illustrating operations in communication in the fifth embodiment.

FIG. 8 is a representation illustrating operations in communication in the fifth embodiment.

Description will be given of a procedure in encryption communication from the communication party A to the communication party B by using FIGS. 7 and 8.

First, the communication party A encrypts a plain text 51 for which application of encryption communication is desired by using a encryption key 5 which the communication party A owns. At this point, in the communication system 41A shown in FIG. 7, the plain text 51 and the encryption key 5 are input from the left side of the encryption/decryption device 42 and conversion sequentially proceeds from the first round R1. The encrypted cipher text 52 is transmitted to the communication party B through the communication processor 47 and the communication channel 40.

The communication party B who has received the cipher text 52 retrieves a plain text 53 by decrypting the cipher text 51 by using the decryption key 6 which the communication party B owns. In the decryption, the decryption key 6 and the cipher text 52 are input from the left side of the encryption/decryption device 42 in the communication system 41B and conversion is conducted from the last round Rn in the order reverse to that in the encryption.

Then, description will be given of a procedure in encryption communication from the communication party B to the communication party A.

First, the communication party B encrypts a plain text 54 for which application of encryption communication is desired by using the decryption key 6 which the communication party B owns. At this point, in the communication system 41B, the decryption key 6 and the plain text 54 are input from the right side of the encryption/decryption device 42 and conversion sequentially proceeds from the first round R1.

The encrypted cipher text 55 is transmitted to the communication system 41A of the communication party A and the communication party A retrieves a plain text 56 by decrypting the cipher text 55 by using the encryption key which the communication party A owns. In the decryption, the encryption key 5 and the cipher 55 are input from the right side of the encryption/decryption device 42 in the communication system 41A and conversion is conducted from the last round Rn in the order reverse to that in the encryption.

In such a manner, the communication party A uses only the encryption key 5 in either cryptographic data transmission and reception of the data. Likewise, the communication party B uses only the decryption key 6. Accordingly, while the encryption key 5 and the decryption key 6 are different from each other, the communication parties A and B are not necessary to have both but they are only required to manage one key.

As described above, since in the communication system according to the embodiment of the present invention, encryption communication is conducted by the communication systems 41A and 41B equipped with the respective encryption/decryption devices 42 in any one of the first to the fourth embodiments, effects similar to in the first to fourth embodiments are achieved and in addition, the number of keys which each communication party has to manage is not increased although the communication parties A and B have respective different keys, which enables the communication system to be managed with ease.

In the mean time, the operational procedures described in the embodiments can be distributed in the form of a recording medium such as a magnetic disk (floppy disk, hard disk etc.), an optical disk (CD-ROM, DVD etc.) and a semiconductor memory in which the operational procedure is stored as programs (software mean) on which a computer run, or alternatively transmitted through a communication medium as the programs. In the mean time, the programs stored on the recording medium side include a setting program which enables software mean which is run by a computer (the means includes not only an execution program, but a table and a data structure etc.) to be established in the computer architecture. A computer which realizes a communication system reads programs recorded in recording medium, forms software means according to the setting program and activates and runs the constituents in the communication system through the software means so as to execute the above described processing.

According to the present invention, as described above, involution functions are employed as key conversion functions for respective rounds of a key conversion section and besides, different keys are respectively used for encryption and decryption and accordingly, there can be provided a data processor, a communication system and a recording medium in which not only can the scale of a secret key encryption device be small but security of the keys can also be increased and key management can also be effected with ease.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data processor in which at least one of encryption of a plain text to a cipher text by using an encryption key and decryption of a cipher text to a plain text by using a decryption key is performed, comprising:

a key converting section in which a plurality of key conversion functions are involution functions, and which conducts key conversions to output extended keys for direct use of encrypting the plain text to the cipher text or decrypting the cipher text to the plain text based on one of the encryption key and the decryption key and results of key conversion of one of the encryption key and the decryption key are sequentially connected, and results of the key conversion are in an order or in another order reverse to the order transferred between the key conversion functions; and a data randomize section in which at least one processing of encryption of the plain text to the cipher text and decryption of the cipher text to the plain text is performed by using the extended keys output from the key conversion section.

2. A data processor according claim 1, wherein the data randomize section includes a plurality of round functions which are involution functions and which perform at least one of encryption and decryption by using the extended keys, the plurality of round functions are sequentially connected, and results of the processing by the round functions are transferred in an order or in another order reverse to the order transferred between the plurality of round functions.

3. A data processor according to claim 1, wherein the key conversion functions take first keys and results of conversion of the first keys as objects to be processed in the key conversion, and perform the key conversion by using a second key.

4. A data processor according to claim 3, wherein the second key is included in at least one of the encryption key and the decryption key.

5. A data processor according to claim 4, wherein the second key has different types of keys, at least one of the encryption key and the decryption key includes the different types of keys and at least one of the encryption key and the decryption key is variable in length.

6. A data processor according to claim 2, wherein the key conversion functions include round functions that are the same as that of the data randomize section.

7. A communication system comprising:

one communication device which includes a data processor according to claim 1 and holds one key which serves as the encryption key and the decryption key; and another device which includes a data processor according to claim 1 and holds other key which serves as the encryption key and the decryption key, and which is a result of key conversion of the one key in the key conversion section of the another device.

8. A computer readable medium on which a program is recorded, the program being for controlling a data processor in which at least one of encryption of a plain text to a cipher text by using an encryption key and decryption of a cipher text to a plain text is performed by using a decryption key, the program comprising:

a key converting section in which a plurality of key conversion functions are an involution function, and which conducts key conversions to output extended keys for direct use of encrypting the plain text to the cipher text or decrypting the cipher text to the plain text based on one of the encryption key and the decryption key and results of key conversion of one of the encryption key and the decryption key are sequentially connected and results of the key conversion are in an order or in another order reverse to the order transferred between the key conversion functions; and a data randomize section in which at least one processing of encryption of the plain text to the cipher text and decryption of the cipher text to the plain text is performed by using the extended keys output from the key conversion section.

9. A computer readable medium according to claim 8, wherein the data randomize section includes a plurality of round functions which are involution functions and which perform at least one of encryption and decryption by using the extended keys, the plurality of round functions are sequentially connected, and results of the processing by the round functions are transferred in an order or in another order reverse to the order transferred between the plurality of round functions.

10. A computer readable medium according to claim 8, wherein the key conversion functions take first keys and results of conversion of the first keys as objects to be processed in the key conversion, and perform the key conversion by using a second key.

11. A recording medium according to claim 10, wherein the second key is included in at least one of the encryption key and the decryption key.

12. A recording medium according to claim 11, wherein the second key has different types of keys, at least one of the encryption key and the decryption key includes the different types of keys and at least one of the encryption key and the decryption key is variable in length.

13. A recording medium according to claim 9, wherein the key conversion functions include round that are the same as that of the data randomize section.

14. A data transformation apparatus comprising:

a key transformation section for outputting a second key and a third key by using an involution function based on inputted first key and for outputting the first key and a fourth key by using the involution function based on inputted second key, wherein the third key is directly used for encrypting plain text to cipher text when first data is transformed to second data and the fourth key is used for decrypting the cipher text to the plain text when the second data is transformed to the first data.

* * * * *

UNITED STATES PATENT AND TRADEMARK OFFICE
CERTIFICATE OF CORRECTION

PATENT NO. : 6,819,764 B1 Page 1 of 1
DATED : November 16, 2004
INVENTOR(S) : Shimizu et al.

It is certified that error appears in the above-identified patent and that said Letters Patent is hereby corrected as shown below:

<u>Title page,</u>
Item [57], ABSTRACT,
Line 2, change "a encryption" to -- an encryption --.

<u>Column 14,</u>
Line 25, change "according claim" to -- according to claim --.

<u>Column 16,</u>
Line 20, change "round that" to -- round functions that --.

Signed and Sealed this

First Day of March, 2005

JON W. DUDAS
*Director of the United States Patent and Trademark Office*